(12) United States Patent
Hu et al.

(10) Patent No.: US 10,017,663 B2
(45) Date of Patent: Jul. 10, 2018

(54) POLYURETHANE/ACRYLIC HYBRID FOR ELASTOMERIC WALL COATINGS

(71) Applicants: Dow Global Technologies LLC, Midland, MI (US); Rohm and Haas Company, Philadelphia, PA (US)

(72) Inventors: Yuehan Hu, Shanghai (CN); Jinyuan Zhang, Shanghai (CN); Xiangting Dong, Shanghai (CN); Yujiang Wang, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 57 days.

(21) Appl. No.: 14/912,630

(22) PCT Filed: Sep. 22, 2013

(86) PCT No.: PCT/CN2013/083881
§ 371 (c)(1),
(2) Date: Feb. 18, 2016

(87) PCT Pub. No.: WO2015/039328
PCT Pub. Date: Mar. 26, 2015

(65) Prior Publication Data
US 2016/0257847 A1    Sep. 8, 2016

(51) Int. Cl.
*C09D 175/04*   (2006.01)
*C08F 230/02*   (2006.01)
*C08F 283/00*   (2006.01)
*C09D 151/08*   (2006.01)

(52) U.S. Cl.
CPC .......... *C09D 175/04* (2013.01); *C08F 230/02* (2013.01); *C08F 283/006* (2013.01); *C09D 151/08* (2013.01)

(58) Field of Classification Search
CPC .................................................... C09D 175/04
See application file for complete search history.

(56) References Cited

U.S. PATENT DOCUMENTS

| | | |
|---|---|---|
| 6,566,438 B1 | 5/2003 | Ingrisch et al. |
| 7,919,556 B2 | 4/2011 | Koziski et al. |
| 2011/0245399 A1* | 10/2011 | Pajerski ............ C08F 283/008 524/457 |

FOREIGN PATENT DOCUMENTS

| | | |
|---|---|---|
| EP | 0625541 A2 | 11/1994 |
| EP | 1887060 A1 | 2/2008 |
| EP | 1958995 A2 | 8/2008 |
| EP | 2133375 A1 | 12/2009 |
| JP | 06329985 A  * | 11/1994 |
| JP | 2006117798 A | 5/2006 |
| WO | 2010051293 A1 | 5/2010 |

* cited by examiner

*Primary Examiner* — Arrie L Reuther
(74) *Attorney, Agent, or Firm* — Karl E. Stauss; Cantor Colburn LLP

(57) ABSTRACT

A polyurethane/acrylic hybrid dispersion comprising a polyurethane dispersion, acrylic monomers and ethylenically unsaturated phosphorus containing monomers. The weight ratio of the solid content of the polyurethane dispersion to the acrylic monomers and the ethylenically unsaturated phosphorus containing monomers is from 3:7 to 7:3. A process of making the polyurethane/acrylic hybrid dispersion.

14 Claims, No Drawings

POLYURETHANE/ACRYLIC HYBRID FOR ELASTOMERIC WALL COATINGS

FIELD OF THE INVENTION

The present invention relates to a new polyurethane/acrylic (PUA) hybrid, especially, a new PUA hybrid with improved elongation particularly suitable for elastomeric wall coatings.

INTRODUCTION

Polyurethane/acrylic (PUA) hybrid dispersions are being developed for elastomeric wall coatings to utilize the merits of both polyurethane, such as high tensile strength and adhesion, and acrylic monomers, such as good weather resistance. Elastomeric wall coatings have special requirements for coating elongation performance. However, it is known that the coating elongation performance decreased significantly with the increase of pigment loading.

It is therefore desired in the art to provide a new PUA hybrid with good elongation performance that is suitable for pigment-containing coatings, especially pigment-containing elastomeric wall coatings.

SUMMARY OF THE INVENTION

The present invention provides a polyurethane/acrylic (PUA) hybrid dispersion comprising a polyurethane dispersion (PU dispersion), acrylic monomers, and ethylenically unsaturated phosphorus containing monomers, and the weight ratio of the solid content of the polyurethane dispersion to that of the acrylic monomers and the ethylenically unsaturated phosphorus containing monomer is from 3:7 to 7:3.

The present invention further provides a process of making such hybrid dispersion.

In a preferred embodiment, the ethylenically unsaturated phosphorus containing monomers are present from 0.3 wt. % to 2.0 wt. % based on the total combined weight of the acrylic monomers and the ethylenically unsaturated phosphorus containing monomers.

In a more preferred embodiment, the ethylenically unsaturated phosphorus containing monomers are selected from phosphoalkyl (meth)acrylates, phosphoalkoxy (meth)acrylates, a salt of phosphoalkyl (meth)acrylates, a salt of phosphoalkoxy (meth)acrylates, and the mixture thereof.

The Tg of the PUA hybrid dispersion of the present invention is preferably less than 15° C. so that the coating film could be formed under room temperature (25° C.).

DETAILED DESCRIPTION OF THE INVENTION

PU Dispersions

PU dispersions of the present invention can be prepared by reacting polyols with polyisocyanates through the processes and under conditions well known in the art.

Commercially purchased PU dispersions may also be used in the present invention. Suitable examples of the PU dispersion include PRIMAL™ U-91 binder available from the Dow Chemical Company, BAYHYDROL™ UH 240, BAYHYDROL™ UH XP 2648 and IMPRANIL™ DL 1537 available from Bayer Material Science AG.

Acrylic Monomers

Acrylic monomers suitable for the present invention include esters of (meth)acrylic acid containing 1 to 18 carbon atoms in the alcohol radical, such as methyl methacrylate, butyl methacrylate, ethyl acrylate, butyl acrylate, cyclohexyl acrylate, hexyl acrylate, 2-ethylhexyl acrylate, stearyl acrylate; di(meth)acrylic acid esters of diols, e.g., ethylene glycol, 1,4-butanediol and 1,6-hexanediol. Methyl (meth)acrylate, ethyl acrylate, butyl acrylate, hexyl acrylate, 2-ethylhexyl acrylate, hydroxyethyl (meth)acrylate, hydroxypropyl (meth)acrylate, glycidyl methacrylate, (meth)acrylic acid and other vinyl monomers, such as styrene, alpha-methyl styrene, ethylene, vinyl acetate, acrylonitrile are preferred.

Ethylenically Unsaturated Phosphorus Containing Monomers

Ethylenically unsaturated phosphorus containing monomers suitable for the present invention include phosphoalkyl (meth)acrylates such as phosphoethyl (meth)acrylate, phosphopropyl (meth)acrylate, and phosphobutyl (meth)acrylate where (meth)acrylate designates methacrylate or acrylate; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate where (meth)acrylate designates methacrylate or acrylate; phospho alkyl (meth)acrylamides such as phospho ethyl (meth)acrylamide, phospho propyl (meth)acrylamide where (meth)acrylamide designates methacrylamide or acrylamide; phosphoalkyl crotonates, phosphoalkyl maleates, phosphoalkyl fumarates, phosphodialkyl (meth)acrylates, phosphodialkyl crotonates, vinyl phosphates and (meth) allyl phosphate. Preferred examples are selected from phosphoalkyl (meth)acrylates, phosphoalkoxy (meth)acrylates, salts of phosphoalkyl (meth)acrylates, and salts of phosphoalkoxy (meth)acrylates. Phosphoethylmethacrylates (PEMs) are most preferred.

Most examples of the ethylenically unsaturated phosphorus containing monomers used in the present invention are acrylic monomers. However, for the convenience of the description, the ethylenically unsaturated phosphorus containing monomers are not included in the acrylic monomers of the present invention.

Ethylenically unsaturated phosphorus containing monomers could be synthesized by well know techniques or commercially available under SIPOMER™ PAM-200, or SIPOMER™ PAM-5000 from Rhodia Inc.

In a preferred embodiment of the present invention, the ethylenically unsaturated phosphorus containing monomers are added with the acrylic monomers to the PU dispersion and are in an amount of from 0.1 wt. % to 2.0 wt. %, preferably from 0.3 wt. % to 1.0 wt. %, and more preferably from 0.4 wt. % to 0.7 wt. % based on the total combined weight of the acrylic monomers and the ethylenically unsaturated phosphorus containing monomers. The ethylenically unsaturated phosphorus containing monomers polymerize with the acrylic monomers in the presence of PU dispersion.

The weight ratio of the solid content of the PU dispersion to that of the acrylic monomers and the ethylenically unsaturated phosphorus containing monomers in the PUA hybrid dispersion is from 3:7 to 7:3, and preferably from 4:6 to 6:4.

PUA Hybrid Dispersions

The preparation of the polyurethane/acrylic (PUA) hybrid dispersion of the present invention may be accomplished by adding the acrylic monomers and the ethylenically unsaturated phosphorus containing monomers to the PU dispersion and polymerizing the acrylic monomers and the ethylenically unsaturated phosphorus containing monomers in the presence of the PU dispersion until the PUA hybrid dispersion is made.

During polymerization of the added acrylic monomers and the ethylenically unsaturated phosphorus containing monomers in the presence of PU dispersion, initiators may be used. Examples of suitable initiators include peroxides such as potassium peroxy-disulphate, ammonium peroxy-disulphate, organic peroxides, organic hydroperoxides and hydrogen peroxide. Redox systems are preferably used. Suitable examples include water-soluble, radical-producing non-ionogenic peroxides, e.g., t-butyl hydroperoxide, as the oxidation component, and sodium formaldehyde sulphoxylate or isoascorbic acid or sodium bisulfite, as the reduction components. Ammonium peroxydisulphate is preferably used. The initiator is suitably used in a range of from 0.05% to 1.0% by weight based on the total weight of all monomers.

The polymerization can be carried out using known method for preparing an aqueous dispersion polymerization, employing non-ionic and/or anionic surfactants. Preferably, the polymerization is carried out with the monomers and is initiated with radical initiators. The dispersion polymerization is generally conducted at temperatures of about 15° C. to about 90° C., preferably 25° C. to 80° C., and more preferably 35° C. to 70° C. After the completion of the polymerization reaction, the hybrid dispersion is allowed to cool to room temperature.

The Tg of the PUA hybrid dispersion of the present invention is preferably less than 15° C. so that the coating film could be formed under room temperature (25° C.).

EXAMPLES

I. Raw Materials

| Abbreviation | Compound Name |
| --- | --- |
| BA | butylacrylate |
| MMA | methylmethacrylate |
| t-BHP | t-butyl hydroperoxide |
| IAA | isoascorbic acid |
| SLS | sodium lauryl sulfate |
| $Fe^{2+}$ | ferrous sulfate |
| EDTA | ethylenediaminetetraacetic acid |
| PEM | phosphoethylmethacrylate |

| Material | Supplier |
| --- | --- |
| NATROSOL ™ 250 HBR hydroxyethylcellulose | Ashland Inc. |
| ammonium (28%) | Sinopharm Chemical Reagent Co., Ltd. |
| propylene glycol | Sinopharm Chemical Reagent Co., Ltd. |
| OROTAN ™ 963 dispersant (35%) | The Dow Chemical Company |
| TRITON ™ EF-106 surfactant | The Dow Chemical Company |
| SN-Defoamer 154 | San Nopco Ltd. |
| TI-PURE ™ R-706 pigment | DuPont China Holding Co., Ltd. |
| CC-700 extender (calcium carbonate) | Guangfu Building Materials Group (China) |
| ACRYSOL ™ RM-5000 rheology modifier | The Dow Chemical Company |
| PRIMAL ™ SCT-275 rheology modifier | The Dow Chemical Company |
| PRIMAL ™ U-91 binder (40% solid PU dispersion) | The Dow Chemical Company |

II. Processes

Elongation

The elongation performance of the coatings was tested with dried coating films (thickness equal to 1.0 mm±0.2 mm). The wet coatings were applied onto an exfoliation paper by an applicator and a coating film of 0.8 mm to 1.2 mm thick was formed. The coating film was dried for 14 days under a 25° C. constant temperature and a 50% relative humidity condition. The elongation of the coating films was measured using an AI-7000M servo control universal testing machine (Gotech Testing Machines Co., Ltd., Taiwan).

The preparation of the coating films referred to the Chinese Standard JG/T 172-2005.

III. Experimental Examples

Preparation for Polyurethane/Acrylic Hybrid Dispersions

PUA Hybrid Dispersion 1

A 3-liter flask reactor equipped with a thermometer, a nitrogen gas inlet tube, a slow addition tube, an agitation/stirring and heating/cooling means, and a condenser was set up. This reactor was charged with 272 g of PRIMAL™ U-91 binder (40% solid), 148 g of distilled water, 8 g of a 0.15% solution of $Fe^{2+}$/EDTA (in a weight ratio of 1:2), 18.7 g of a 2.8% solution of t-BHP, 47 g of a 1.62% solution of PEM neutralized with ammonia and 254 g of a monomer mixture containing BA and MMA in a ratio of 76:23.7 under nitrogen. The reaction mixture was warmed to 35° C. and 20.4 g of a 2.0% solution of IAA was added. The beginning of polymerization was signaled by a rise in temperature. The final reaction temperature was raised to above 60° C. After the completion of the reaction, another 23.0 g of 3.4% t-BHP and another 22.7 g of 3.0% IAA were fed into the reactor during one hour. After the addition was completed, the reaction was held for half an hour. A stable PUA hybrid dispersion having a solid content of about 40 percent was obtained.

PUA Hybrid Dispersion 2

The process was the same as that for the preparation of PUA hybrid dispersion 1, except for that 78.1 g of a 1.62% solution of PEM neutralized with ammonia and 253.6 g of a monomer mixture containing BA and MMA in a weight ratio of 76:23.5 were added in this preparation.

PUA Hybrid Dispersion 3

The process was the same as that for the preparation of PUA hybrid dispersion 1, except for that 363 g of PRIMAL™ U-91 binder, 80.4 g of a 1.62% solution of PEM neutralized with ammonia and 217.2 g of a monomer mixture containing BA and MMA in a weight ratio of 76:23.4 were added in this preparation.

PUA Hybrid Dispersion 4

The process was the same as that for the preparation of PUA hybrid dispersion 1, except for that 363 g of PRIMAL™ U-91 binder, 133.9 g of a 1.62% solution of PEM neutralized with ammonia and 216.3 g of a monomer mixture containing BA and MMA in a weight ratio of 76:23 were added in this preparation.

PUA Hybrid Dispersion 5

The process was the same as that for the preparation of PUA hybrid dispersion 1, except for that 544 g of PRIMAL' U-91 binder, 53.6 g of a 1.62% solution of PEM neutralized with ammonia and 144.8 g of a monomer mixture containing BA and MMA in a weight ratio of 76:23.4 were added in this preparation.

PUA Hybrid Dispersion 6

The process was the same as that for the preparation of PUA hybrid dispersion 1, except for that 544 g of PRIMAL™ U-91 binder, 107.2 g of a 1.62% solution of PEM neutralized with ammonia and 143.9 g of a monomer mixture containing BA and MMA in a weight ratio of 76:22.8 were added in this preparation.

PUA Hybrid Dispersion 7

The process was the same as that for the preparation of PUA hybrid dispersion 1, except for that 634.5 g of PRIMAL™ U-91 binder, 6.7 g of a 1.62% solution of PEM neutralized with ammonia and 109.1 g of a monomer mixture containing BA and MMA in a weight ratio of 76:23.9 were added in this preparation.

PUA Hybrid Dispersion 8

The process was the same as that for the preparation of PUA hybrid dispersion 1, except for that 634.5 g of PRIMAL™ U-91 binder, 40.2 g of a 1.62% solution of PEM neutralized with ammonia and 108.6 g of a monomer mixture containing BA and MMA in a weight ratio of 76:23.4 were added in this preparation.

PUA Hybrid Dispersion 9

The process was the same as that for the preparation of PUA hybrid dispersion 1, except for that 634.5 g of PRIMAL™ U-91 binder, 134 g of a 1.62% solution of PEM neutralized with ammonia and 107 g of a monomer mixture containing BA and MMA in a weight ratio of 76:22 were added in this preparation.

PUA Hybrid Dispersion 10

The process was the same as that for the preparation of PUA hybrid dispersion 1, except for that 363 g of PRIMAL™ U-91 binder, 80.4 g of a 1.62% solution of PEM neutralized with ammonia and 217.2 g of a monomer mixture containing BA and MMA in a weight ratio of 76:23.4 were added in this preparation.

PUA Hybrid Dispersion 11 (Comparative Example)

The process was the same as that for the preparation of PUA hybrid dispersion 1, except for that a solution of PEM neutralized with ammonia was not added in this preparation.

PUA Hybrid Dispersion 12 (Comparative Example)

The process was the same as that for the preparation of PUA hybrid dispersion 1, except for that 363 g of PRIMAL™ U-91 binder and 218.5 g of a monomer mixture containing BA and MMA in a weight ratio of 76:24 were added in this preparation, while a solution of PEM neutralized with ammonia was not added.

PUA Hybrid Dispersion 13 (Comparative Example)

The process was the same as that for the preparation of PUA hybrid dispersion 1, except for that 544 g of PRIMAL™ U-91 binder and 145.6 g of a monomer mixture containing BA and MMA in a weight ratio of 76:24 were added in this preparation, while a solution of PEM neutralized with ammonia was not added.

PUA Hybrid Dispersion 14 (Comparative Example)

The process was the same as that for the preparation of PUA hybrid dispersion 1, except for that 634.5 g of PRIMAL™ U-91 binder and 109.2 g of a monomer mixture containing BA and MMA in a weight ratio of 76:24 were added in this preparation, while a solution of PEM neutralized with ammonia was not added.

Polyurethane and Polyacrylic Cold Blend Dispersion 15 (Comparative Example)

This example was a cold blend composition of a polyacrylic (PA) dispersion and a PRIMAL™ U-91 binder. The PA dispersion was polymerized from monomers: 22% MMA, 75.4% BA, 2% MAA and 0.6% SIPOMER™ PAM-200 (available from Rhodia Inc.). The PA dispersion was blended with PRIMAL™ U-91 binder at room temperature. The blend weight ratio was 60% polyacrylic to 40% polyurethane.

Preparation for Coatings

Coating 1 to 15

Coatings 1 to 15 comprising, respectively, polyurethane/acrylic hybrid dispersions 1 to 14 and cold blend dispersion 15 were prepared using the following formulation. The usages of ACRYSOL™ RM-5000 and PRIMAL™ SCT-275 might be different in different coatings to keep a coating viscosity from 100 to 110 KU.

| Coating formulation | |
|---|---|
| Material | Weight (g) |
| Grind | |
| Water | 35.68 |
| NATROSOL ™ 250 HBR hydroxyethylcellulose | 0.40 |
| ammonia (28%) | 0.02 |
| propylene glycol | 7.63 |
| OROTAN ™ 963 dispersant (35%) | 2.54 |
| TRITON ™ EF-106 surfactant | 0.40 |
| SN-Defoamer 154 | 0.22 |
| TI-PURE ™ R-706 pigment | 58.63 |
| CC-700 extender | 104.48 |
| Let down | |
| PUA hybrid (or cold blend) dispersion | 227.00 |
| ACRYSOL ™ RM-5000 rheology modifier | 1.50 |
| PRIMAL ™ SCT-275 rheology modifier | 4.44 |
| Water | 59.80 |
| Total | 502.74 |

IV. Results

TABLE 1

| Elongation performance of paint at 40 PVC | | | |
|---|---|---|---|
| Coating | PU:acrylic monomers | PEM (%) | Elongation (%) |
| 1 | 3:7 hybrid | 0.3 | 309.0 |
| 2 | 3:7 hybrid | 0.5 | 315.5 |
| 11# | 3:7 hybrid | 0 | 292.1 |
| 3 | 4:6 hybrid | 0.6 | 472.0 |
| 4 | 4:6 hybrid | 1.0 | 486.7 |
| 12# | 4:6 hybrid | 0 | 287.1 |
| 5 | 6:4 hybrid | 0.6 | 388.2 |
| 6 | 6:4 hybrid | 1.2 | 396.5 |
| 13# | 6:4 hybrid | 0 | 197.5 |
| 7 | 7:3 hybrid | 0.1 | 410.0 |
| 8 | 7:3 hybrid | 0.6 | 476.6 |
| 9 | 7:3 hybrid | 2.0 | 482.8 |
| 14# | 7:3 hybrid | 0 | 399.7 |
| 10 | 4:6 hybrid | 0.6 | 577.8 |
| 15# | 4:6 cold blend | 0.6 | 169.0 |

Comparative examples

40PVC coatings comprising PUA hybrid dispersions with PEM compared with PUA hybrid dispersions without PEM, had higher elongation. As shown in Table 1, coatings 1 to 2 compared with coating 11 (comparative example), coatings 3 to 4 compared with coating 12 (comparative example), coatings 5 to 6 compared with coating 13, coatings 7 to 9 compared with coating 14 (comparative example), all had increases in elongation performances.

Coating 10 comprising a PUA hybrid dispersion had a significantly increased elongation compared with coating 15 (comparative example) comprising a cold blend of PU and PA under the same PEM loadings.

What is claimed is:

1. A polyurethane/acrylic hybrid dispersion comprising
a polyurethane dispersion, acrylic monomers, a pigment, and ethylenically unsaturated phosphorus containing monomers,
wherein the polyurethane/acrylic hybrid dispersion is made by polymerizing in a polyurethane dispersion, acrylic monomers, a pigment, and ethylenically unsaturated phosphorus containing monomers,
wherein the weight ratio of the solid content of the polyurethane dispersion to that of the acrylic monomers and the ethylenically unsaturated phosphorus containing monomers is from 3:7 to 7:3.

2. The polyurethane/acrylic hybrid dispersion according to claim 1 wherein the ethylenically unsaturated phosphorus containing monomers are present from 0.3 wt. % to 2.0 wt. % based on the total combined weight of the acrylic monomers and the ethylenically unsaturated phosphorus containing monomers.

3. The polyurethane/acrylic hybrid dispersion according to claim 2 wherein the ethylenically unsaturated phosphorus containing monomers are present from 0.5 wt. % to 1.5 wt. % based on the total combined weight of the acrylic monomers and the ethylenically unsaturated phosphorus containing monomers.

4. The polyurethane/acrylic hybrid dispersion of claim 3 wherein the ethylenically unsaturated phosphorus containing monomers comprise phosphoethylmethacrylates.

5. The polyurethane/acrylic hybrid dispersion of claim 2 wherein the ethylenically unsaturated phosphorus containing monomers comprise phosphoethylmethacrylates.

6. The polyurethane/acrylic hybrid according to claim 1 wherein the ethylenically unsaturated phosphorus containing monomers are selected from phosphoalkyl (meth)acrylates, phosphoalkoxy (meth)acrylates, salts of phosphoalkyl (meth)acrylates, salts of phosphoalkoxy (meth)acrylates, and the mixture thereof.

7. The polyurethane/acrylic hybrid dispersion of claim 6 wherein the ethylenically unsaturated phosphorus containing monomers comprise phosphoethylmethacrylates.

8. The polyurethane/acrylic hybrid dispersion according to claim 1 wherein the weight ratio of the solid content of the polyurethane dispersion to that of the
acrylic monomers and the ethylenically unsaturated phosphorus containing monomers is from 4:6 to 6:4.

9. The polyurethane/acrylic hybrid dispersion of claim 8 wherein the ethylenically unsaturated phosphorus containing monomers comprise phosphoethylmethacrylates.

10. The polyurethane/acrylic hybrid dispersion of claim 1 wherein the ethylenically unsaturated phosphorus containing monomers comprise phosphoethylmethacrylates.

11. A process of making a polyurethane/acrylic hybrid dispersion comprising polymerizing in a polyurethane dispersion, acrylic monomers, a pigment, and ethylenically unsaturated phosphorus containing monomers,
wherein the weight ratio of the solid content of the polyurethane dispersion to that of the acrylic monomers and the ethylenically unsaturated phosphorus containing monomers is from 3:7 to 7:3.

12. The process according to claim 11 wherein the ethylenically unsaturated phosphorus containing monomers are present from 0.3 wt. % to 2.0 wt. % based on the total combined weight of the acrylic monomers and the ethylenically unsaturated phosphorus containing monomers.

13. The process according to claim 11 wherein the ethylenically unsaturated phosphorus containing monomers are selected from phosphoalkyl (meth)acrylates, phosphoalkoxy (meth)acrylates, salts of phosphoalkyl (meth)acrylates, salts of phosphoalkoxy (meth)acrylates, and the mixture thereof.

14. The process according to claim 11 wherein the weight ratio of the solid content of the polyurethane dispersion to that of the acrylic monomers and the ethylenically unsaturated phosphorus containing monomers is from 4:6 to 6:4.

* * * * *